United States Patent
Wang et al.

(10) Patent No.: US 6,245,407 B1
(45) Date of Patent: Jun. 12, 2001

(54) THERMOFORMABLE HONEYCOMB STRUCTURES

(75) Inventors: Yen-Seine Wang; Emi Lee, both of San Ramon; Mark S. Caldwell, Castro Valley; Robert Petrisko, Danville, all of CA (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 09/299,868

(22) Filed: Apr. 27, 1999

(51) Int. Cl.$^7$ .................................................. B32B 3/12
(52) U.S. Cl. ..................... 428/116; 427/207.1; 427/430.1
(58) Field of Search ..................... 428/116, 118, 428/593; 427/207.1, 430.1

(56) References Cited

U.S. PATENT DOCUMENTS

| | | | |
|---|---|---|---|
| 3,673,058 | 6/1972 | Jackson et al. | 161/68 |
| 4,957,577 | 9/1990 | Huebner | 156/197 |
| 5,139,596 | 8/1992 | Fell | 156/205 |
| 5,217,556 | 6/1993 | Fell | 156/205 |
| 5,260,117 | 11/1993 | Myers et al. | 428/196 |
| 5,288,537 | 2/1994 | Corden | 428/116 |
| 5,498,462 | 3/1996 | Darfler | 428/116 |
| 5,685,936 | 11/1997 | Komine et al. | 156/182 |

FOREIGN PATENT DOCUMENTS

4128957 * 3/1993 (DE) .

* cited by examiner

*Primary Examiner*—Francis J. Lorin
(74) *Attorney, Agent, or Firm*—W. Mark Bielawski; David J. Oldenkamp

(57) ABSTRACT

Resins which are a combination of phenolic and polyamide polymers are used as dipping resins to coat composite honeycomb structures. The phenolic/polyamide dipping resins increase the heat formability of composite honeycomb structures. The dip resin forms a coating on the honeycomb which includes from 30 to 95 weight percent phenolic resin and 5 to 30 weight percent polyamide resin. The dip resin is especially useful for coating composite honeycomb cores made from graphite or glass fibers impregnated with flexible phenolic resins.

13 Claims, 3 Drawing Sheets

THERMOFORMABLE HONEYCOMB STRUCTURES

BACKGROUND OF THE INVENTION

1. Field of the Invention

The present invention relates generally to non-metallic honeycomb structures which are heat formed (thermoformed) into a variety of different shapes. More particularly, the present invention is directed to such structures which include a resin impregnated composite core which is coated with one or more matrix resins to improve the structural strength of the honeycomb.

2. Description of Related Art

Honeycomb structures are well known and widely used in many applications where a high strength and lightweight material is required. The combined features of lightweight and strength found in honeycomb structures makes them particularly well-suited for use in aircraft and other applications where high strength and low weight are required. Honeycomb structures have been made from a wide variety of materials including metals, such as aluminum. Composite materials made from resin impregnated fibers and papers have also been widely used in honeycomb structures. Thermosetting resins have typically been used as the resin matrix of choice in cases where the honeycomb is used as part of a structural member where optimum honeycomb strength is required.

One common process for fabricating honeycomb structures involves bonding multiple sheets of material together along specially oriented node lines. The node lines are offset between different layers in such a way that a honeycomb structure is formed when the layers are expanded. This type of process is commonly referred to as "expansion" process. The expansion process is not suitable for fabricating honeycomb structures in some instances where certain thermoset matrix resins are used. For example, sheets made from certain materials which are too stiff or porous cannot be formed into honeycomb structures using the expansion process.

A fabrication process or method commonly referred to as the "corrugation" process has been used to form high strength thermoset honeycomb structures in those situations where the expansion process cannot be used. The corrugation process involves initially shaping sheets of uncured thermoset or thermoplastic material into a corrugated configuration. The corrugated sheets are cured at high temperature to form stiff corrugated sheets which are then bonded together to form the honeycomb core. The honeycomb core is then optionally coated with a matrix or dip resin. The honeycomb core is generally cut into numerous flat panels which can be used "as is" or further processed in accordance with conventional honeycomb fabrication techniques. For example, the honeycomb core may be sandwiched between sheets of various materials to form extremely strong structural panels.

In many instances, it is desirable to take the high strength thermoset honeycomb core and shape it into non-planar structural elements. This is accomplished by heating the honeycomb core until it becomes sufficiently soft to allow it to be molded or otherwise shaped into the desired configuration. A number of problems have been experienced during the heat forming of thermoset panels into non-planar shapes. For example, the final structural strength of thermoset honeycomb cores can be adversely affected by the high temperatures required to soften the cured resin. In addition, many of the high strength adhesives that are used to bond the panels together become weak at temperatures below those required to soften the thermoset material. As a result, the cores become uncontrollably distorted and weakened during the heat forming process. This problem is especially acute for heavy density and/or small cell honeycomb cores.

In view of the above, there is a need to provide honeycomb cores which are sufficiently strong to be useful as structural panels and which can be heat molded into non-planar shapes without unduly distorting or otherwise adversely affecting the honeycomb structure or strength.

SUMMARY OF THE INVENTION

In accordance with the present invention, a honeycomb structure is provided wherein the heat formability of the structure is improved by coating the honeycomb core with a dip resin which is composed of phenolic and polyamide resins. It was discovered that use of the combined phenolic/polyamide dip resin not only increases the heat formability of the honeycomb core, but also increases the overall strength of the honeycomb.

Honeycomb structures of the present invention include a honeycomb core which is composed of core fibers which are impregnated with a core resin. The surface of the core is coated with a dip resin which is made up of phenolic resin and polyamide resin. Dip resins composed of polyamide and phenolic resins were found to increase the yield stress of the core over dip resins which employed phenolic resin alone. In addition, the node strength of the core was increased. Further, the heat formability was increased, i.e., planar honeycomb cores made using a phenolic/polyamide dip resin could be thermoformed into structures having much smaller radii of curvature than similar cores utilizing a phenolic dip alone.

The present invention is well-suited for use in improving the formability of honeycombs which include interleaf layers (bisector sheets) and are made with carbon, glass or aramid fibers wherein the fibers are impregnated with a phenolic resin. Honeycombs which include interleaf layers are generally identified as heavy density honeycombs.

The dip resins of the present invention are resin solutions which include a resin portion which contains from 10 to 95 weight percent phenolic resin and 5 to 90 weight percent polyamide resin. The dip resin is applied to the honeycomb core in accordance with known dipping procedures and may be advantageously used as a replacement for dip resins in other honeycomb fabrication processes where a dip resin is needed or desirable.

The above-discussed and many other features and attendant advantages of the present invention will become better understood by reference to the following detailed description when taken in conjunction with the accompanying drawings.

DETAILED DESCRIPTION OF THE INVENTION

The honeycomb structures of the present invention are well-suited for use in making a wide variety of high strength non-planar honeycomb structures. Such structures include, for example, aircraft engine nacelles, high performance automobile and boat bodies and other applications where high strength and lightweight contoured structures are necessary.

Figure 1:
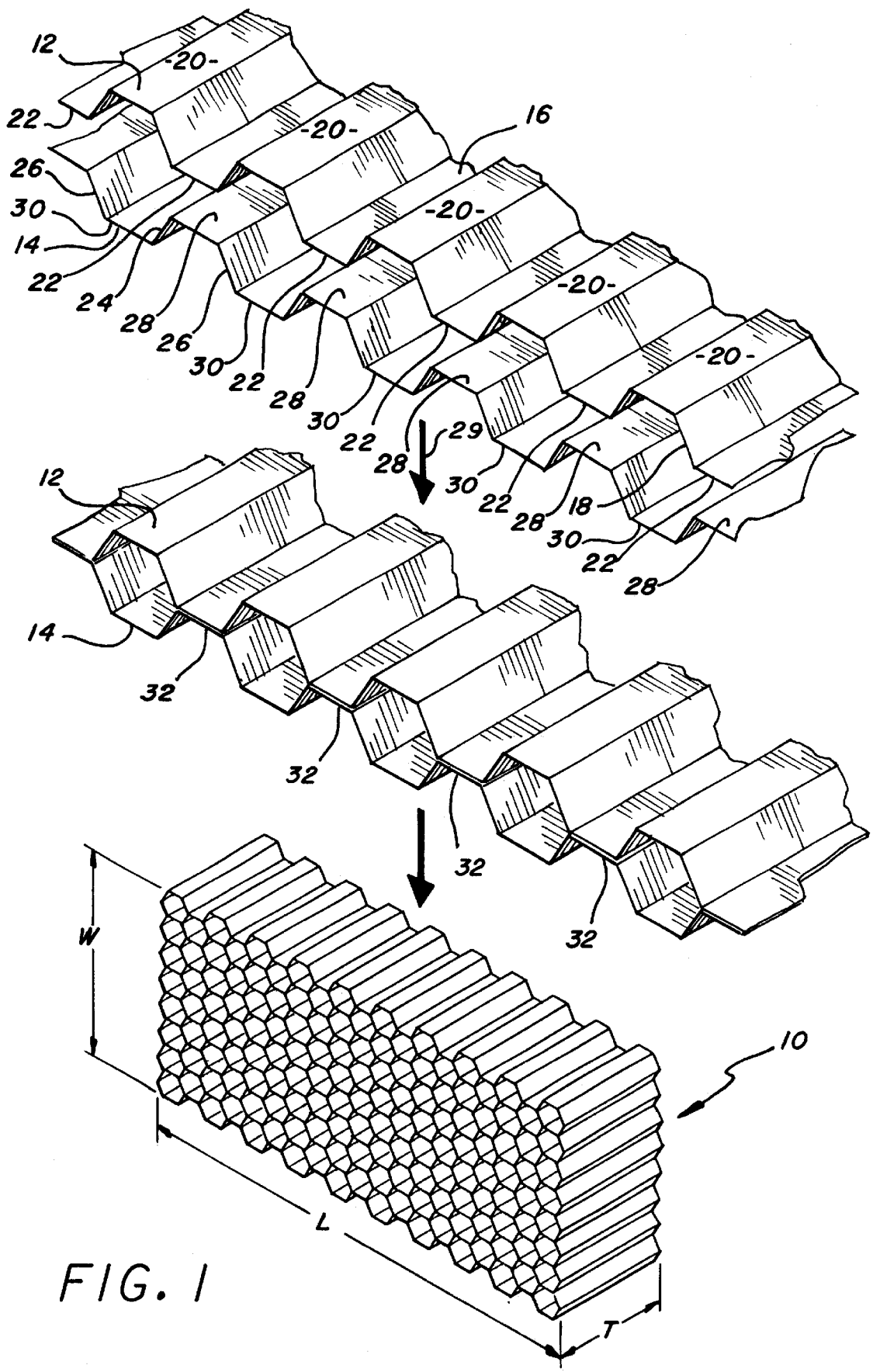
FIG. 1 is a simplified schematic representation of the method for making a high-strength heat formable non-metallic honeycomb structure in accordance with the present invention.

Referring to FIG. 1, a thermoformable or heat formable non-metallic honeycomb in accordance with the present invention is shown generally at 10. The honeycomb 10 includes a plurality of stacked corrugated sheets which are bonded together to form the honeycomb 10. A simplified process for constructing the honeycomb from corrugated sheets is diagrammatically represented in FIG. 1. The process is shown utilizing only two corrugated sheets 12 and 14 with it being understood that the same process is carried out numerous times with additional corrugated sheets to obtain multi-layered honeycomb of the type shown at 10. The corrugated sheets are composite materials which typically include fibers impregnated with a core resin.

The corrugated sheet 12 has a top surface 16 and bottom surface 18. The top surface 16 includes top node surfaces 20. The bottom surface 18 includes bottom node surfaces 22. Likewise, the corrugated thermoplastic sheet or thermoset prepreg 14 also includes a top surface 24 and a bottom surface 26. The top surface 24 includes top node surfaces 28 and bottom node surfaces 30. As represented in FIG. 1, by the top vertical arrow 29, the two corrugated sheets 12 and 14 are bonded together using a node adhesive so that the top node surfaces of the lower layer 14 are bonded to the bottom node surfaces of the upper layer 12. This process is repeated numerous times for additional corrugated sheets. In each case, the upper node surfaces 28 of the lower layer are bonded to the bottom node surfaces 22 of the upper layer. As previously mentioned, for simplicity FIG. 1 shows only the bonding of two layers together with it being understood that this process is repeated numerous times in order to achieve a honeycomb of the type shown at 10. The bonding locations between the two corrugated sheets 12 and 14 are shown at 32. This process utilizes the principles of the corrugation process which are well-known to those skilled in the art.

In accordance with the present invention, the honeycomb 10 is coated with a sufficient amount of phenolic/polyamide dip resin which is cured to provide honeycomb having the desired density, strength and thermal formability. The phenolic/polyamide resin is an important aspect of the present invention which will be described in detail below.

Figure 2:
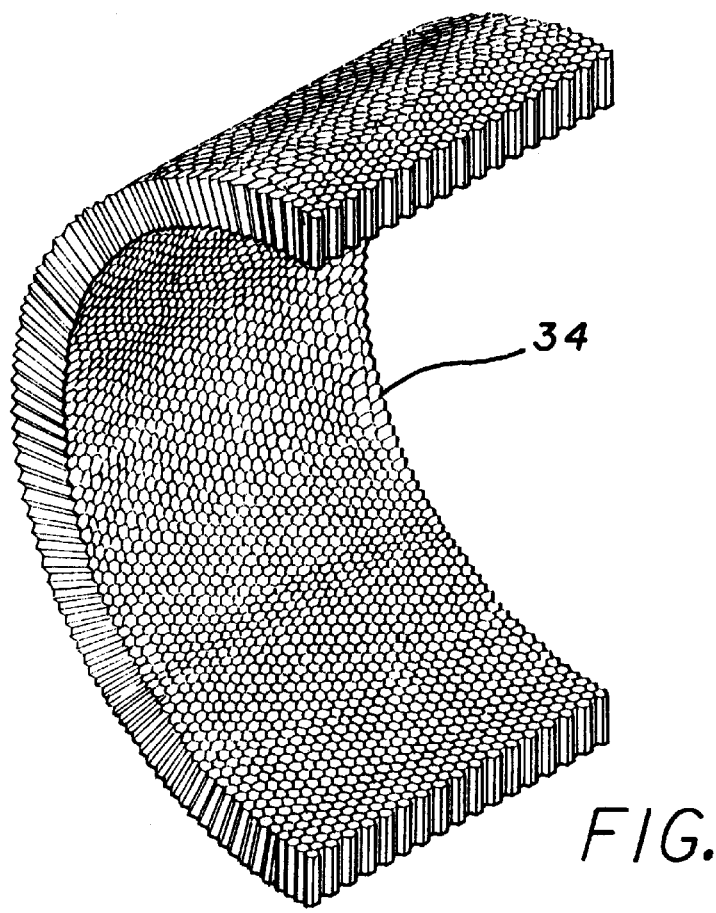
FIG. 2 is a representative example of a non-metallic honeycomb which has been heat formed into a non-planar shape.

In accordance with the present invention, the final honeycomb core must be amenable to heat forming. In order to achieve the required heat-forming characteristics, the core composite material must be sufficiently flexible to allow formation into the corrugated sheets. In addition, the corrugated sheets, node adhesive and dip resin must also be sufficiently plastic, upon heating, to allow thermoforming of the honeycomb core into a variety of non-planar shapes, such as the C-shaped section shown at 34 in FIG. 2. Certain combinations of core resins, fiber types and fiber configurations are well-suited for heat forming into high strength non-planar honeycomb structures. Core resins which may be suitably used in accordance with the present invention include flexible phenolics, polyimide, polyamideimide (PAI) and polyetherimide (PEI). Other suitable thermoplastic resins include high performance engineering thermoplastics such as polyethersulfone and polyarylethers. Modified phenolics and PAI are preferred core resins.

In order to be considered a flexible phenolic, the phenolic resin must have a sufficiently low cross-link density to make it flexible. Low cross-linked phenolics can be achieved by increasing the chain length. Alternatively, the curing conditions can be chosen so as to keep cross-linking of the phenolic resin to a minimum. Procedures for producing flexible phenolics are well-known. Exemplary flexible phenolics which may be used as the core or prepreg resin are made by Georgia Pacific (Decatur, Georgia) and identified as GP493T24 and GP493T24M resins.

Additional exemplary resins which may be utilized as core matrix resins are PAI which is available under the tradename AI-10 from AMOCO Performance Products (Alpharetta, Ga.); PEI marketed under the tradename ULTEM1000 by General Electric (Pittsfield, Mass.); and polyamideimide which is available from Rhone-Poulenc (Louisville, Ky.) under the tradename NOLIBOND. Modified phenolics may also be used provided that they are sufficiently flexible to be thermoformed. Modified phenolics are made by adding one or more suitable modifiers to phenolic resin and co-curing the combination to form a modified phenolic which is more flexible than highly crosslinked phenolics. Exemplary modifiers include polyamide, bisphenol A, epoxy, rubbers, polyvinyl formal resins, polyvinyl butyral resin and other resins which can be co-cured with a phenolic to form core resin matrix which is sufficiently flexible to be heat formable. The preceding resins (including flexible phenolics), when impregnated into suitable fiber cloth or mat, can be formed at temperatures ranging from 150° C. to 200° C. into corrugated sheets which can then be bonded together as shown in FIG. 1 to form honeycomb cores. The honeycomb core is then dipped to final density with dip resin.

As mentioned above, honeycomb are typically cut to form a plurality of slices which are substantially planar in shape. These substantially planar slices of honeycomb are then heated to temperatures of between about 200° C. to 400° C. in order to soften the honeycomb cores sufficiently so that they can be molded or otherwise shaped into complex, non-planar shapes, such as the C-shaped body shown in FIG. 2 at 34.

Numerous different types of fibers may be used as part of the corrugated sheets. Preferred exemplary fibers include glass, carbon, ceramic, aramid, boron and other fibers utilized in high strength composite materials. The diameter of the fibers and number of fibers making up a particular yarn or tow can be varied widely depending upon the honeycomb core being made. A multitude of different fabric weave patterns may be used. Carbon and glass fibers impregnated with a flexible phenolic are preferred. The invention is especially well suited for improving the formability of fiberglass-based heavy density honeycomb cores which include interleaf layers. The invention is also applicable to honeycomb made from aramid, such as NOMEX and super calendared kraft paper and blends thereof.

Figure 3:
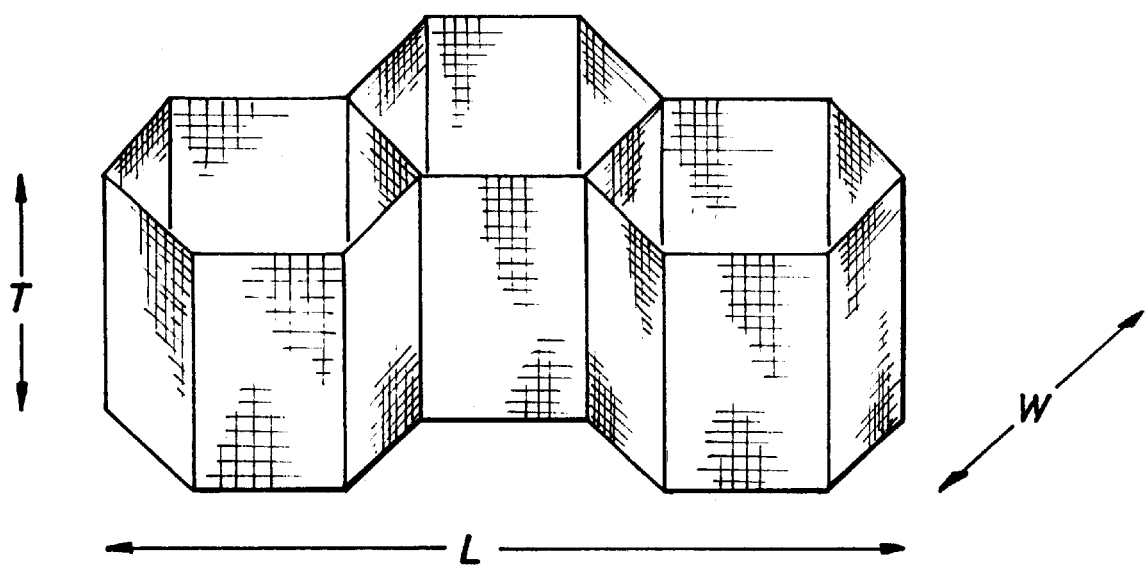
FIG. 3 is a detailed view of a portion of the honeycomb structure showing an exemplary fiber orientation.
Figure 4:
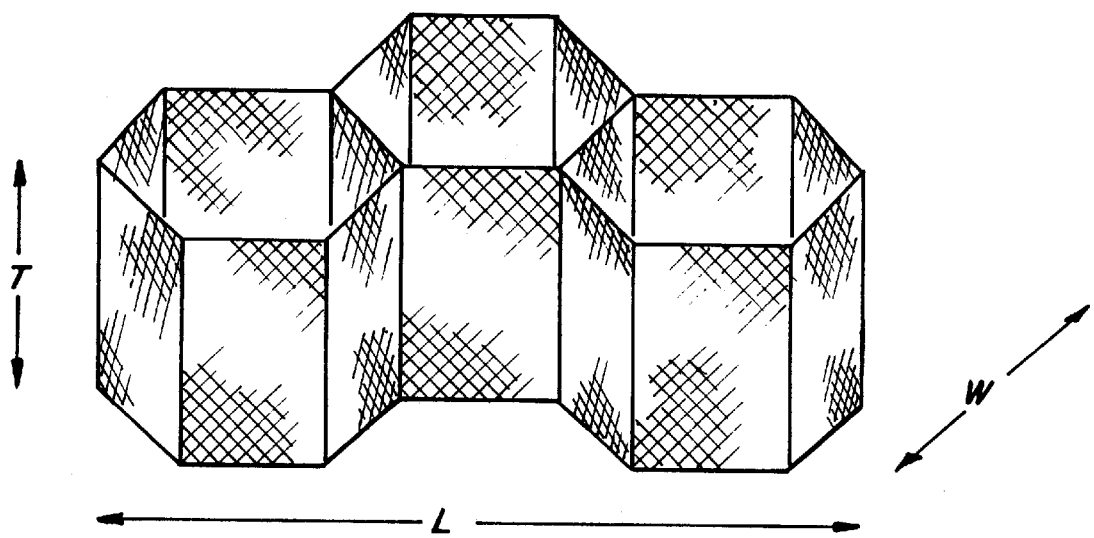
FIG. 4 is a detailed view of a portion of the honeycomb structure showing an alternate orientation of fibers.

The orientation of the fibers within the honeycomb cell walls may vary widely. Fiber orientation and type is chosen depending upon the desired honeycomb characteristics including mechanical strength and the ease with which the honeycomb may be thermoformed. It is preferred that woven fabric be used to maximize strength. However, other fiber types are possible including random fiber orientation, unidirectional fiber orientation and chopped fibers. For maximum formability, it is preferred that, the majority of fibers will be oriented so they extend at an angle of ±30°–60° relative to the T-direction of the honeycomb core. This particular fiber orientation is shown in FIG. 4 for a small section of a preferred honeycomb core structure. In FIG. 4, and throughout the drawings, W, L and T stand for width, length and thickness directions, respectively. The specific angle orientation shown in FIG. 4 is approximately ±45° relative to the T-direction. The fiber configuration shown in FIG. 4 is preferred in order to enhance the high temperature formability of the honeycomb structure. The fiber orientation shown in FIG. 3 may also be used where the majority of fibers are oriented to extend substantially parallel or transverse to the T-direction of the honeycomb core. This particular configuration is preferred when maximum strength of the honeycomb is desired. Many other fiber orientations between the two shown in FIGS. 3 and 4 are possible to achieve desired levels of thermoformability and mechanical strength.

The corrugated sheets may be bonded together using any of the known bonding techniques typically used in honeycomb core construction. Preferably, the nodes will be bonded together using thermoplastic adhesives. It is preferred that the adhesives are matched to the prepreg resin if a thermoplastic is used in the corrugated sheets. Preferred exemplary thermoplastic adhesives include PAI or PEI adhesives. The adhesives are composed of PAI or PEI in an appropriate solvent such as N-methyl-2-pyrrolidone. Thermoset adhesives may also be used. Suitable thermoset adhesives include epoxy, phenolics, and polyimides. In addition, the layers may be bonded together by thermowelding ultrasonic bonding, friction bonding, diffusion bonding or by solution welding using a solvent which dissolves the thermoplastic materials together at the node locations. All of these bonding techniques are known in the art.

Figure 5:
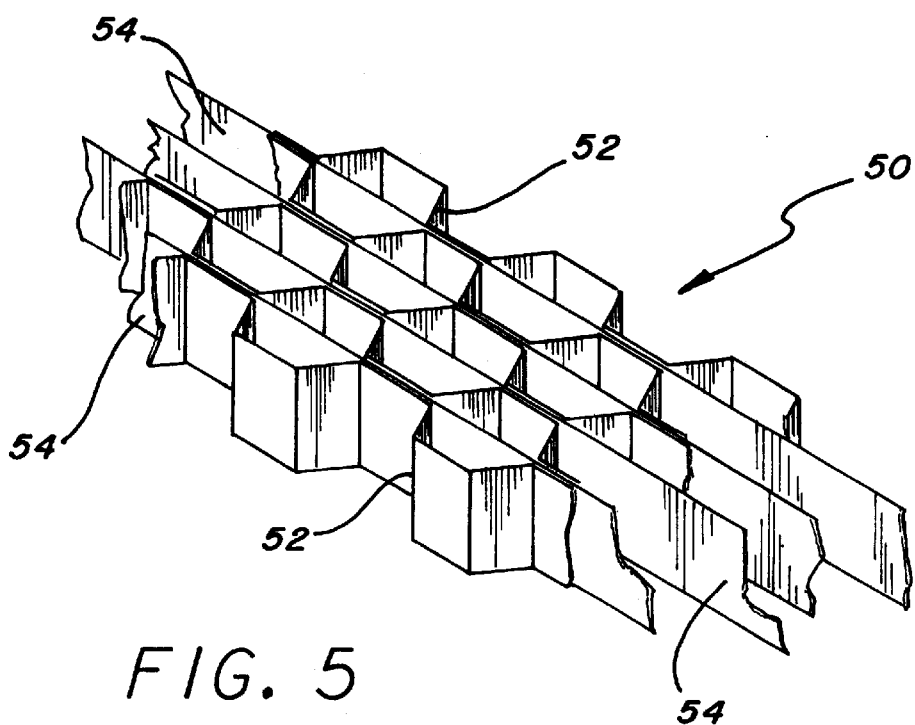
FIG. 5 is a partial view of an exemplary high density honeycomb structure which includes bisector sheets.

The honeycomb cores are shown in the figures as having hexagonal cells. As is well-known other cell shapes can be used including cells with interleafs or bisectors. A portion of an exemplary honeycomb which includes bisector sheets is shown generally at 50 in FIG. 5. The honeycomb 50 includes walls 52 which form the conventional honeycomb cells and bisector sheets 54 which pass through the center of each cell. This type of honeycomb core is commonly referred to as "heavy density honeycomb." The present invention is particularly well-suited for increasing the thermo-formability of heavy density honeycomb structures like honeycomb 50.

The honeycomb is coated with a dipping resin prior to thermoforming. The dip resin is a combination of phenolic and polyamide resins which are both incorporated into a sufficient amount of a suitable diluent or solvent to provide a solids solution which can be applied to the honeycomb in the same manner as known dip resins. Although any number of different phenolic resins may be used for the phenolic portion of the dip resin, flexible phenolic resins are preferred. Flexible phenolics have a relatively low cross-link density when compared to non-flexible phenolics.

Low cross-linking of the phenolic is achieved by increasing the chain length or adding suitable modifiers such as bisphenol A or other resins which can be co-cured with phenolics. Alternatively, the curing conditions can be chosen so as to keep cross-linking of the phenolic resin to a minimum. Procedures for producing flexible phenolics are well-known. Exemplary flexible phenolics which may be used in the dip resin are made by Georgia Pacific (Decatur, Ga.) and identified as GP493T24 and GP493T24M phenolic resin. Phenolic resins made by OxyChem Corp. (Grand Island, N.Y.) and identified as 43243 and 23-057 phenolic resins are also suitable. Other suitable phenolic resins include SC913B which is made by Borden Chemical (Columbus, Ohio).

The polyamides used in the dipping resin should have relatively high elongation at break at room temperature and relatively high impact strength. Exemplary polyamides include GRILAMID® TR55 which is available from EMS-Chemie AG (Zurich, Switzerland) and ELVAMIDE® 8061 which is available from DuPont (Wilmington, Delaware). GRILAMID® TR55 is a polyamide based on nylon 12 which has an elongation at break (ASTM 638) of 120 percent for dry-as-molded material and 220 percent for conditioned material. ELVAMIDE® 8061 is a nylon multipolymer resin which has an elongation at break (ASTM 0638) of 300 percent. The Izod impact strength for GRILAMID® TR55 (ASTM 256) is 59 Joule/meter for dry-as-molded material and 112 Joule/meter for conditioned material. Other properties of GRILAMID® TR55 and ELVAMID® 8061 are set forth in product brochures which are available from the manufacturers.

The dip resin is made by combining solutions of phenolic and polyamide resins. Phenolic resins are typically supplied as a solution which includes from 50 to 60 weight percent phenolic resin dissolved in a suitable solvent such as isopropyl alcohol. A small amount of water is also usually present in the solution. Polyamide resins are usually supplied as dry pellets. It is preferred that the polyamide pellets be dissolved in a suitable solvent, such as benzyl alcohol, to provide a solids solution having from 5 to 25 weight percent polyamide resin. Polyamide resin solutions containing about 10 weight percent resin are preferred.

The phenolic and polyamide resins are combined in amounts which produce a dip resin that includes from 10 to 45 weight percent total resin and 90 to 55 weight percent solvent. The amount of phenolic and polyamide resin present in the dip resin may be varied depending upon a number of different parameters including the viscosity required for different application techniques, desired coating thickness and number of coating layers desired. Dip resins which include from 20 to 30 weight percent resin solids are preferred. The viscosity of the dip resin solution should be on the order of 200 to 800 centipoise (cps).

The resin portion of the dip resin or dip solution includes from 10 to 95 weight percent phenolic resin and from 5 to 90 weight percent polyamide resin. Preferred weight percentages are from 55 to 80 weight percent phenolic resin and 20 to 45 weight percent polyamide resin. More preferred weight percentages are from 65 to 75 weight percent phenolic resin and from 25 to 35 weight percent polyamide resin. When cured, the dip resin forms a coating which is a modified phenolic having the same percentage of phenolic and polyamide resins which is present in the resin portion of the dip resin. The solvents used in the dip resin include any of the common solvents used in connection with phenolic and/or polyamide resins. Benzyl alcohol, isopropyl alcohol and combinations thereof are preferred.

An exemplary procedure for making a dip resin in accordance with the present invention is as follows:

A 10 weight percent solution of GRILAMIDE® R TR55 (Solution A) is prepared by dissolving GRILAMIDE® TR55 pellets in benzyl alcohol. Solution A is mixed with Solution B (GP493T24–55 weight percent phenolic resin in isopropyl alcohol) to form a dip resin solution which includes 70 weight percent Solution A and 30 weight percent Solution B. The resulting dip resin has about 24 weight percent resin which is dissolved in about 76 weight percent of a solvent composed of benzyl and isopropyl alcohol. The resin portion of the dip resin contains about 30 weight percent polyamide and about 70 weight percent phenolic resin. The concentration of resin in Solutions A and B may be varied provided that the solutions are combined in sufficient relative amounts to produce a dip resin solution wherein the total amount of resin constitutes from 10 to 45 weight percent of the solution and the relative amounts of phenolic resin and polyamide resin in the resin portion of the solution fall within weight percent limits set forth above. If desired, a relatively concentrated dip resin may be prepared. The concentrated dip resin is then further diluted with isopropyl and/or benzyl alcohol to form the final working dip resin.

Another dip resin was prepared in the same manner as the preceding example except that the amounts of solutions A and B were varied to provide a dip solution where the resin portion contained about 21 weight percent polyamide and about 79 weight percent phenolic resin. A further exemplary dip solution was prepared in the same manner except that the resin portion contained about 35 weight percent polyamide and about 65 weight percent phenolic resin. Both of the above dip resins performed satisfactorily as dip resins.

The phenolic/polyamide dipping resin is applied to the honeycomb in the same manner as conventional dipping resins. The honeycomb may be submerged in the dipping resin or the dipping resin may be applied by flow coating. The number of coats of dipping resin and the overall resin thickness may be varied.

Exemplary combinations of honeycomb cores and dipping resins in accordance with the present invention are set forth in Table 1. The weight percentages of phenolic resin and polyamide resin which are set forth in Table 1 are the dry weight percentages of each resin in the resin portion of the dip resin solution. The resin portion of the dip resin is dissolved in benzyl/isopropyl alcohol solvent to provide a 24 weight percent solids solution. The weight percentages in Table 1 are only for the solids portion of the solution.

TABLE 1

| Fiber Type | Matrix Resin | Adhesive | Dip Resin |
| --- | --- | --- | --- |
| E-glass or S-glass | 493T24M | PAI | 70 wt % 493T24M 30 wt % Gilamide TR55 |
| pitch-based carbon | 493T24M | PAI | 70 wt % 493T24M 30 wt % Grilamide TR55 |
| pan-based carbon | 493T24M | PAI | 90 wt % 493T24M 10 wt % Grilamide TR55 |
| Aramid | 493T24M | PAI | 70 wt % 493T24M 30 wt % Grilamide TR55 |

The various types of fibers listed in Table 1 preferably range in size from 1k to 12k. Preferred fabrics are those having a fiber orientation in the honeycomb which is 0/90 or ±45. Various basic weave patterns may be used including plain, twill, satin, crowfoot satin, plain derivative, leno and mock leno. Plain weave patterns are preferred, The honeycomb core will preferably include bisector sheets. Although the present invention may be used in connection with honeycomb cores that lack bisector sheets, it is most applicable to high density cores where the bisector sheets reduce the formability of the core.

Examples of practice are as follows:

A dipping resin was prepared by combining GP493T24M phenolic resin (55 weight percent resin in isopropyl alcohol) with a solution of benzyl alcohol containing 10 weight percent GRILAMIDE® TR55 polyamide. The two solutions were combined in amounts sufficient to form a 24 weight percent solids solution in which the total resin content was 72 weight percent phenolic resin and 28 weight percent polyamide resin. The dip resin had a viscosity of 300 cps.

A heavy density hexagonal honeycomb core (FIG. 5) was prepared in which carbon fabric was impregnated with GP493T24M flexible phenolic to form a prepreg. The carbon fiber cloth had a plain weave style with the fibers being oriented at 0/90 in the core. The honeycomb was formed using a corrugation process in which the prepreg was cured at a temperature of 150° to 225° C. to form corrugated sheets. The corrugated sheets were bonded together using an AI-10 node adhesive. The resulting honeycomb was dipped in a bath of the dipping resin to coat the honeycomb walls.

The dipping resin was cured at a temperature of about 175° C. The honeycomb was then cut to form planar honeycomb cores. The coated honeycomb cores were then heated to a temperature of 420° and formed into non-planar structures. The panels could be heat formed to radii of curvature of about 16–18 inches with yield stress being 80–112 psi and strain on the order of 2.5%. Comparative panels were prepared wherein all fabrication parameters remained the same except that the dip resin did not include GRILAMID® TR55. The resulting panels could only be heat formed at 420° F. to produce structures with radii of curvature of about 27 inches and a yield stress of 51 psi. Strain was about 1.8%.

A high density honeycomb core was also prepared using the same basic procedure set forth in the preceding paragraph except that fiber glass fabric was substituted for the carbon fiber fabric. The glass mat had a plain weave style with the fibers being oriented at 0/90 in the final core. The resulting fiber glass honeycomb core could be heat formed at 420° F. to a radius of curvature of 12 inches with a yield stress of 96.1 psi.

Having thus described exemplary embodiments of the present invention, it should be noted by those skilled in the art that the disclosures herein are exemplary only and that various other alternations, adaptations and modifications may be made within the scope of the present invention. Accordingly, the present invention is not limited to the specific embodiments as illustrated herein.

What is claimed is:

1. In a honeycomb structure comprising a honeycomb core having walls comprising core fibers and core resin, said walls having a surface on which is coated a dip resin comprising phenolic resin, wherein the improvement comprises adding polyamide resin to said dip resin in an amount sufficient to increase the heat formability of said honeycomb structure.

2. An improved honeycomb structure according to claim 1 wherein said core fibers comprise glass or carbon fibers.

3. An improved honeycomb structure according to claim 2 wherein said core resin comprises a flexible phenolic resin.

4. An improved honeycomb structure according to claim 1 wherein said dip resin comprises from 10 to 95 weight percent phenolic resin and from 5 to 90 weight percent polyamide resin.

5. An improved honeycomb structure according to claim 4 wherein said core fibers comprises glass fibers and said core resin comprises a flexible phenolic resin.

6. An improved honeycomb structure according to claim 1 wherein said dip resin is uncured.

7. An improved honeycomb structure according to claim 1 wherein said dip resin is cured.

8. In a method for making a honeycomb comprising the steps of:

forming a honeycomb core having walls comprising core fibers and core resin, said walls having a surface; and applying a dip resin which comprises phenolic to said surface, wherein the improvement comprises adding polyamide resin to said dip resin in an amount sufficient to increase the heat formability of said honeycomb.

9. An improved method according to claim 8 which includes the step of heat forming said honeycomb.

10. An improved method for making a honeycomb structure according to claim 8 wherein said core fibers comprise carbon or glass fibers.

11. An improved method for making a honeycomb structure according to claim 10 wherein said core resin comprises a flexible phenolic resin.

12. An improved method for making a honeycomb structure according to claim 8 wherein said resin comprises from 10 to 95 weight percent phenolic resin and from 5 to 90 weight percent polyamide resin.

13. An improved method for making a honeycomb structure according to claim 12 wherein said core fibers comprises glass fibers and said core resin comprises a phenolic resin.

* * * * *